United States Patent

[11] 3,617,341

| [72] | Inventor | Gerald B. Fefferman |
| | | Parsippany, N.J. |
| [21] | Appl. No. | 862,480 |
| [22] | Filed | Sept. 30, 1969 |
| [45] | Patented | Nov. 2, 1971 |
| [73] | Assignee | Bell Telephone Laboratories Incorporated |
| | | Murray Hill, N.J. |

[54] METHOD OF DEPOSITING IN SITU A CERAMIC OR GLASS FILM ON THE SURFACES OF A SUBSTRATE
4 Claims, No Drawings

[52] U.S. Cl. ................................................. 117/46 CA,
117/169, 117/123 A, 117/124 A
[51] Int. Cl. ........................................................ B44d 1/46,
C03c 5/00
[50] Field of Search ........................................ 117/46 CB,
124 B, 124 D, 124 A, 46 CA, 169

[56] References Cited
UNITED STATES PATENTS

| 2,593,817 | 4/1952 | Waggoner | 117/46 CA |
| 2,737,463 | 3/1956 | Lawton et al. | 117/46 CA |
| 2,842,457 | 7/1958 | Morgan et al. | 117/46 CA |
| 3,158,495 | 11/1964 | Murray et al. | 117/46 CA |
| 3,477,868 | 11/1969 | Grundschober et al. | 117/46 CA |
| 2,440,691 | 5/1948 | Jira | 117/46 CB |
| 3,185,586 | 5/1965 | Saunders et al. | 117/124 B |
| 3,313,632 | 4/1967 | Langley et al. | 117/124 B |
| 3,377,197 | 4/1968 | Erby et al. | 117/124 D |
| 3,379,709 | 4/1968 | Louden | 117/124 B |
| 3,508,950 | 4/1970 | Marzocchi | 117/126 GS |

*Primary Examiner*—William D. Martin
*Assistant Examiner*—M. Sofocleous
*Attorneys*—R. J. Guenther and Edwin B. Cave

ABSTRACT: An inorganic film in either the crystalline or vitreous state is formed in situ on a suitable substrate by the decomposition of metal and/or metalloidal resinates. A plurality of metallic and/or metalloidal resinates, which form inorganic oxides upon decomposition in air or an oxidizing atmosphere, are physically admixed to form a resinate mixture. The resinate mixture is applied to the substrate and the substrate is fired in air to a temperature sufficient to (1) decompose the resinate mixture to form the inorganic oxides and (2) combine the resultant inorganic oxides to form a film either in the crystalline or amorphous state on the surfaces of the substrate.

METHOD OF DEPOSITING IN SITU A CERAMIC OR GLASS FILM ON THE SURFACES OF A SUBSTRATE

GOVERNMENT CONTRACT

The invention herein claimed was made in the course of, or under contract with the Department of the Army.

1. Field of the Invention

This invention relates to a method of depositing in situ a ceramic or glass film on the surface of a suitable substrate, and more particularly, to depositing a film by decomposing mixtures of metallic and/or metalloidal resinates.

2. Description of the Prior Art

In the deposition of glass films on the surfaces of suitable substrates, the usual procedure is to prepare the glass prior to application. The components of the desired glass are thoroughly mixed and the mixture is heated to a temperature sufficient to melt and combine the glass constituents into an amorphous state, i.e., into a glass. The glass formed is then fritted, dry or wet milled and sieved to obtain glass particles having a desired maximum particle size. The sieved glass particles are then applied to the substrate either in a dry application through dusting or by means of a liquid carrier, usually water. When the glass is suspended in a liquid carrier, it can be sprayed or brushed onto the substrate. The substrate is then heated to remelt the fritted glass to form a glass film. Where an opacified glass is desired, nucleating agents can be incorporated into the glass and after the glass film has been applied to the substrate, the substrate can be further heat treated to cause crystallization, or alternatively, opacifiers can be initially colloidally dispersed throughout the glass upon the first melting.

There are several disadvantages in coating a substrate in the manner indicated above. The glass needed to coat the substrate has to be formed in two or more distinct heating or melting steps. If the glass frit is dusted onto the substrate, there may be defects in the coating due to the nonuniformity of the dusting. If on the other hand, the fritted glass is applied by spraying the frit in a liquid carrier, nonuniformity of the coating may occur due to lack of adhesion of the glass and carrier to the substrate. The above applications could lead to pinholes, blisters and bare spots after the melting of the frit. The formation of a glass in situ would obviate these difficulties. Also, the use of a "true" solution, which would form a glass in situ, would be more compatible with many of the coating techniques such as spraying, spinning and dipping than a solution containing suspended glass frit.

SUMMARY OF THE INVENTION

In accordance with the present invention a technique is described for the deposition of an inorganic film in situ on a suitable substrate member by the decomposition of a mixture of resinates. More particularly, at least two inorganic oxide-forming organic resinates are physically admixed to form a resinate mixture. The resultant mixture is then applied to the substrate in any suitable manner, whereupon the substrate is heated in air or an oxidizing atmosphere to a temperature which is sufficient to decompose the resinate mixture to form various inorganic oxides. These inorganic oxides then combine to form an amorphous or crystalline film in situ upon the surface of the substrates. DETAILED DESCRIPTION The materials selected for use in the particles of the present invention will now be given.

The substrate member may be selected from among those materials which can withstand elevated temperatures, such as mica, ceramic, silica, glass or high temperature-resistant metals.

The resinates which are physically admixed with one another to form a mixture may consist of metallic resinates, e.g., lead resinate, sodium resinate, and/or metalloidal resinates, e.g., boron resinate, silicon resinate. The term "resinate" may be defined as any salt or ester of a resin acid or a mixture of such acids. Under this general class of compounds are included constituents of naturally occuring resinates, resin extrudations from trees and synthetic preparations.

In preparing the metallic and metalloidal resinates, the metal or metalloid is substituted into or added to the organo resinates. The metal may be one selected from Group 1A, 2A, 1B to 7B, and 8 elements of the Periodic Table of the Elements as reproduced at page B2 of the *Handbook of Chemistry and Physics*, 45th edition, 1964-1965, published by the Chemical Rubber Company. The metalloids may be one selected from Group 3A to 6A elements of the Periodic Table of Elements as reproduced at page B2 of the *Handbook of Chemistry and Physics*, 45th edition, 1964-1965, published by the Chemical Rubber Company.

Practical considerations dictate the use of a suitable solvent or thinner as a medium for carrying the resinate and the resultant resinate mixture so that the mixture can be evenly distributed or dispersed in an even coating on the surfaces of the substrate selected. The thinner may be a simple organic solvent such as toluene, but usually the thinner is a mixture of essential oils, terpenes, resins and the like, carefully chosen to impart specific physical properties to the composition. These properties such as oiliness, viscosity, evaporation rate, surface tension and tack will vary for different methods of application. The requisite properties and the solvents or thinners required to produce them are well known to those skilled in the art of making inks, paints and lacquers.

The metallic or metalloidal resinates are selected so that upon combination with each other and upon subsequent decomposition in an oxidizing atmosphere, inorganic oxides will form in definite proportions which combine with one another in either a crystalline state or an amorphous or glassy state. What determines which state is obtained, of course, depends upon the oxides selected for combination with one another and the temperature to which the substrate is heated. The peak temperature will depend upon the particular substrate selected and can be as high as 3,000° F. for a 99.5 percent alumina substrate. Therefore, those particular oxides which can combine with each other in the amorphous state at the temperature to which the substrate is heated, will so combine. If the inorganic oxides are to be combined in the crystalline state, then those oxides are selected which combine in the crystalline state even up to the peak temperature to which a substrate can be heated. The oxides chosen and the temperatures employed to obtain either an amorphous state or a crystalline state are well known to those skilled in the ceramic art and are readily ascertainable.

The concentration of the particular metallic and/or metalloidal resinates are selected so that upon application to the substrate and upon decomposition, the resulting oxide mixture will comprise the desired percentage of each inorganic oxide to be combined in either the amorphous or crystalline state. The concentration of each resinate to be employed is readily ascertainable and one skilled in the ceramic art can devise any number of suitable resinate combinations wherein the constituents are present in varying concentrations.

The desired thickness of the film is important since if the film is too thin, it may be hidden in the pores or surface irregularities of the substrate. If on the other hand the film is too thick a noncontinuous or spotty inorganic oxide film will result. This noncontinuous film is due to the inability of the organic matter to burn off cleanly when the mixed resinate coating is applied too heavily. The preferred thickness of the film after firing has been found to be between 1,000 to 10,000 A.

The mixed resinate solution is applied to the substrate in any pattern desired by any one of a number of standard procedures such as brushing, dipping, spin-coating, spraying, roller coating, decalcomania transfer or printing, which includes screen printing, offset printing and printing with rubber dies. After suitable application of a film of a mixed resinate solution to the substrate, the substrate is permitted to dry in circulating, heated air. The thinners or solvents contained in the mixed resinate solutions are driven off and a mixed resinate coating remains.

Following the drying step, the coated substrate is placed in a furnace and heated in air or an oxidizing atmosphere. The temperature at which the substrate is heated is one which is sufficient to (1) decompose the various resinates to form inorganic oxides and (2) to combine in situ the resultant oxides with one another into either a crystalline or an amorphous state. This temperature may be in the range of 800° F. to 3,000° F. depending upon the substrate chosen. As indicated above, whether or not the oxides combine in the crystalline state or the amorphous state is dependent in the oxides chosen and the temperature within the above range to which the substrate is heated. The time-temperature parameters are readily ascertainable experimentally by one practicing the invention and one skilled in the art can devise a number of suitable time-temperature schedules. In this regard, it should be noted that where the oxides are combined to form a glass the temperature to which the substrate is heated must not be so low as to result in failure to achieve the desired continuous amorphous phase and must not be so high as to produce undesired bubbles or blisters.

It is preferred to fire the substrate on a three phase firing cycle. Prior to firing the substrate, it is placed in a conventional drying oven to partially remove the thinners, leaving the coating in a tacky condition. This tacky film can, however, withstand normal handling without marring or blemishing. The substrate is then placed in a conventional furnace or film and heated up to 400° F. at which point it is held for approximately 15 minutes to insure that all of the thinners have been removed. The temperature is then raised to at least 800° F. for 30 to 60 minutes in order to insure complete decomposition and removal of carbonaceous matter. If necessary, the furnace temperature is raised to a third firing stage in order to combine the oxides. This peak temperature will, of course, depend upon the substrate and the oxides chosen.

After the substrate has been heat treated to form in situ a glassy or crystalline film on its surfaces, the substrate is cooled to room temperature at such a rate as to reduce the amount of stress formed in the substrate and the glassy or crystalline matrix.

This invention will be understood more fully from the following description of specific embodiments of the invention, which are presented for the purpose of illustration only and not to limit the scope of the invention as defined in the annexed claims. One specific mixture that was employed in forming a glass film in situ on a suitable substrate was the following:

I. 1. 2 parts by weight of a lead resinate solution containing 27.8 percent by weight of lead in resinate form, obtained from commercial sources.
2. 1 part by weight of a silicon resinate solution containing 9.3 percent by weight of silicon in resinate form, obtained from commercial sources.

The above constituents were thoroughly mixed and the resultant resinate mixture was applied to a 2 inch ×2 inch, 99.5 percent alumina ceramic substrate by spin coating, from a flooded start, at 445 r.p.m. for 30 seconds. The spin-coated substrate was then dried at 160° F. for 1 hour, in a standard, circulating air drying oven, to partially remove the thinners leading to a tacky coating on the substrate. The substrate was then inserted in a furnace and air fired to a temperature of 400° F. for 15 minutes in order to completely remove the thinners. The mixed resinate coated substrate was then fired to a temperature of 800° F. for 30 minutes to completely decompose the resinates into the oxides of silicon and lead. The temperature was then raised to 1400° F. to combine said oxides and to form in situ on the surfaces of the substrate a lead silicate glass film, composed of 25 percent $SiO_2$ and 75 percent PbO. The resulting glass coated substrate was then allowed to slowly cool through normal radiation from 1400° F. to 400° F. (2 hours) whereupon it was removed from the furnace.

A second specific example employed the following:
II. 1. 4.35 parts by weight of a silicon resinate solution containing 9.3 percent by weight of silicon in resinate form, from commercial sources.
2. 13.1 parts by weight of a boron resinate solution containing 1.5 percent by weight of boron in resinate form, from commercial sources.
3. 4.1 parts by weight of a lead resinate solution containing 27.8 percent by weight of lead in resinate form, from commercial sources.

The above constituents were thoroughly mixed and the resinate mixture was applied to a 2 inch ×2 inch, 99.5 percent alumina ceramic substrate by spin-coating from a flooded start at 280 r.p.m. for 30 seconds. The spin-coated substrate was then placed in a standard, circulating air, drying oven where it was dried at 160° F. for 1 hour. This drying partially removed the thinners contained in the liquid film coating leading to a tacky coating on the substrate. The substrate was then inserted in a furnace and air fired to a temperature of 400° F. for 15 minutes in order to completely remove the thinners. The temperature was then raised to 800° F. for 30 minutes to completely decompose the resinates into the oxides of silicon, boron and lead, whereafter the substrate was fired to 1600° F. to combine said oxides to form in situ a lead borosilicate glass film on the substrate. The resulting glass is composed of 31% $SiO_2$, 25% $B_2O_3$ and 44% PbO. The resulting glass coated substrate was then allowed to slowly cool through normal radiation to 400° F. (2,25 hours), whereupon it was removed from the furnace.

What is claimed is:
1. A method of depositing an inorganic oxide film on the surface of a suitable substrate, which comprises:
combining at least two organic resinates which are capable of decomposing in an oxygen ambient to form inorganic oxides, said resinates being selected from the group consisting of boron silicon and lead resinates
and mixtures thereof, to form a resinate mixture;
coating the surface of the substrate with said resinate mixture; and
heating the substrate to a temperature in the range of 800 to 3,000° F. thereby resulting in decomposition of the resinate mixture and yielding inorganic oxides, said oxides combining in situ with each other, to form an oxide film on the substrate.
2. The method as defined in claim 1 wherein said oxides combine to form an inorganic glass film on the surfaces of the substrate.
3. The method as defined in claim 2 wherein:
said organic resinates consist of a lead resinate and a silicon resinate; and wherein,
said glass film is a lead silicate glass film.
4. The method as defined in claim 2 wherein:
said organic resinates consist of a lead resinate, a silicon resinate and a boron resinate; and wherein,
said glass film is a lead borosilicate glass film.

* * * * *

UNITED STATES PATENT OFFICE
CERTIFICATE OF CORRECTION

Patent No. 3,617,341  Dated November 2, 1971

Inventor(s) Gerald B. Fefferman

It is certified that error appears in the above-identified patent and that said Letters Patent are hereby corrected as shown below:

Column 1, line 38, after "dusting" cancel the comma and insert a period;

line 62, change "substrates" to --substrate--, after the period delete "DETAILED DESCRIPTION" and insert on the next line as a heading in the center;

line 63, after "the" second occurrence cancel "particles" and insert --practice--.

Column 2, line 10, after "of" second occurrence and before "Ele-" insert --the--;

line 48, cancel "concentration" and substitute --concentrations--;

Column 3, line 10, after "dependent" cancel "in" and insert --on--.

Column 4, line 43, (Claim 1), after "boron" insert a comma, after "lead" cancel "resinates" and insert --resinate--.

Signed and sealed this 27th day of June 1972.

(SEAL)
Attest:

EDWARD M. FLETCHER, JR.
Attesting Officer

ROBERT GOTTSCHALK
Commissioner of Patents